Figure 1:
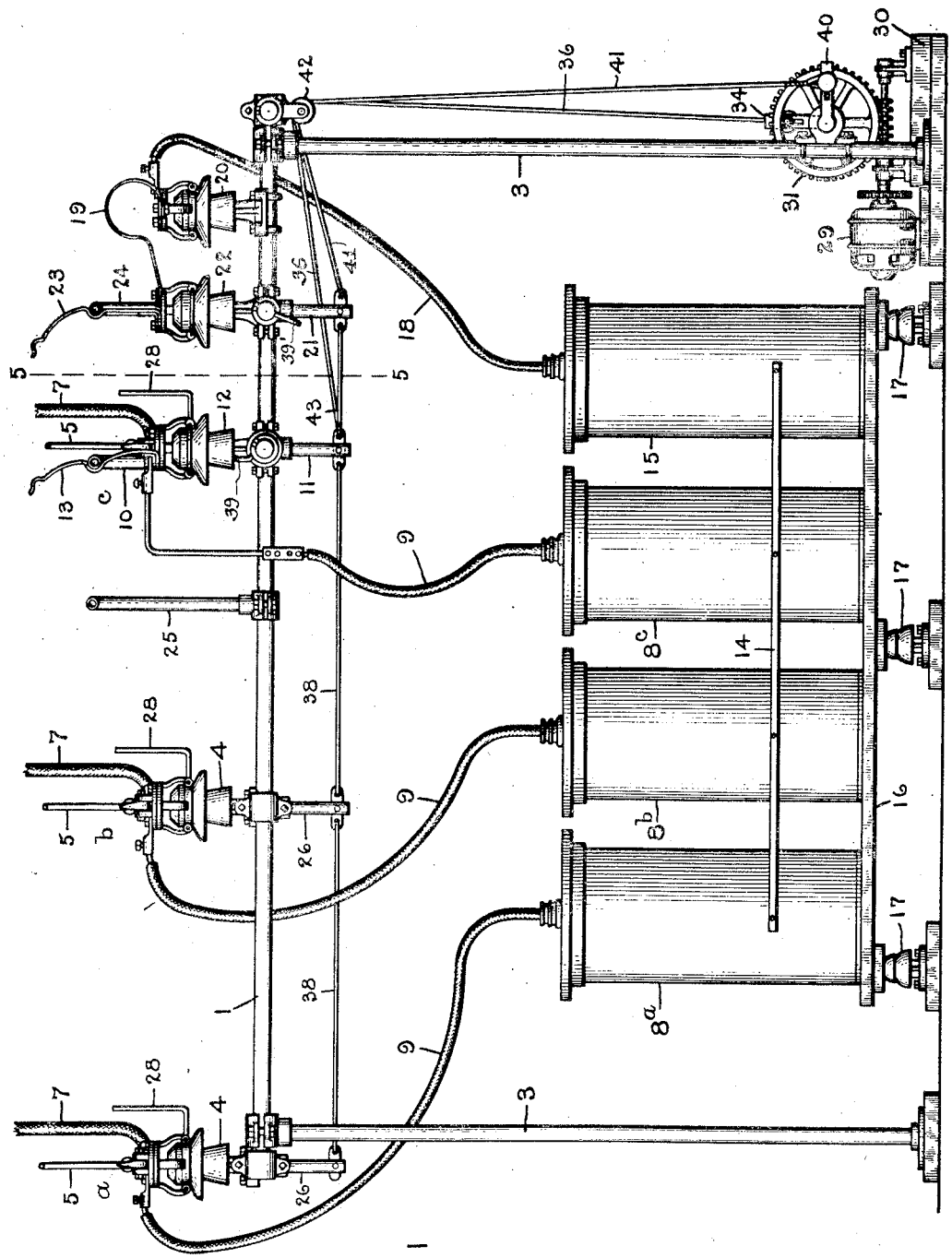

E. E. F. CREIGHTON.
LIGHTNING ARRESTER.
APPLICATION FILED JULY 6, 1909.

982,224.

Patented Jan. 17, 1911.

4 SHEETS—SHEET 1.

WITNESSES:
Lester H. Fulmer
J. Ellis Glen

INVENTOR
ELMER E. F. CREIGHTON.
BY Albert G. Davis
ATT'Y.

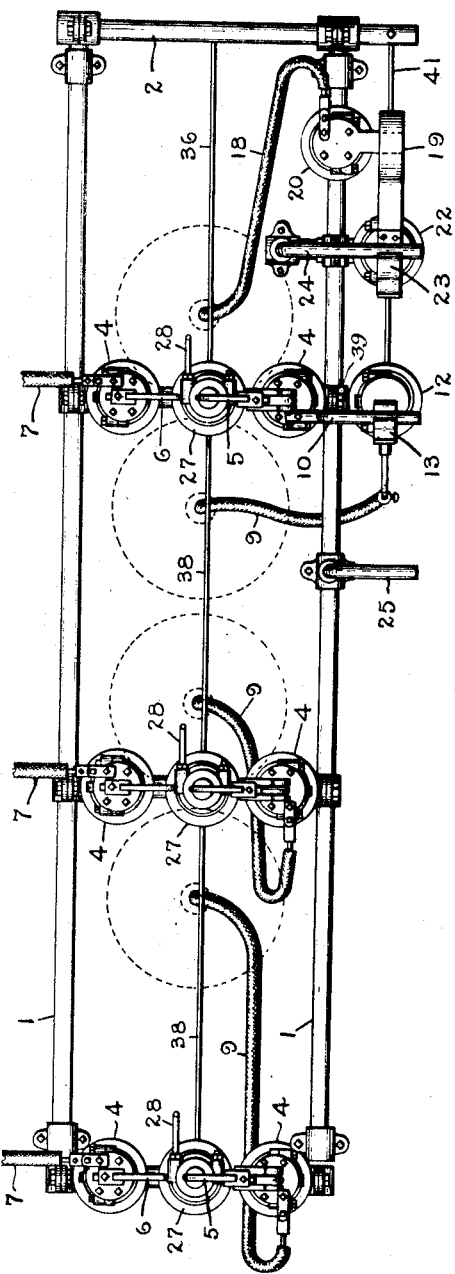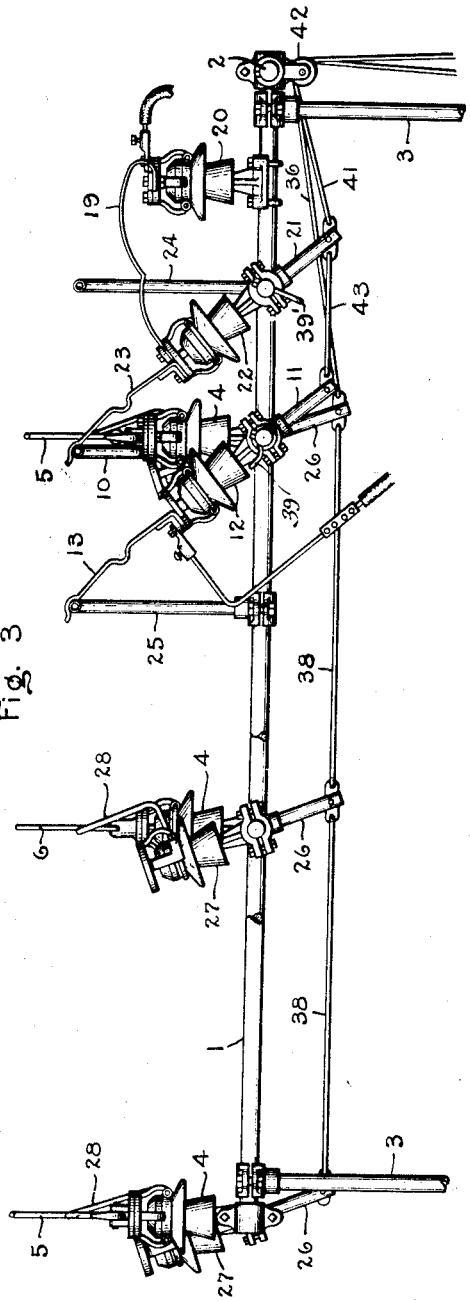

E. E. F. CREIGHTON.
LIGHTNING ARRESTER.
APPLICATION FILED JULY 6, 1909.

982,224.

Patented Jan. 17, 1911.

4 SHEETS—SHEET 3.

WITNESSES:
Lester H. Fulmer.
J. Ellis Elen.

INVENTOR
ELMER E. F. CREIGHTON.
BY
Albert G. Davis
ATT'Y.

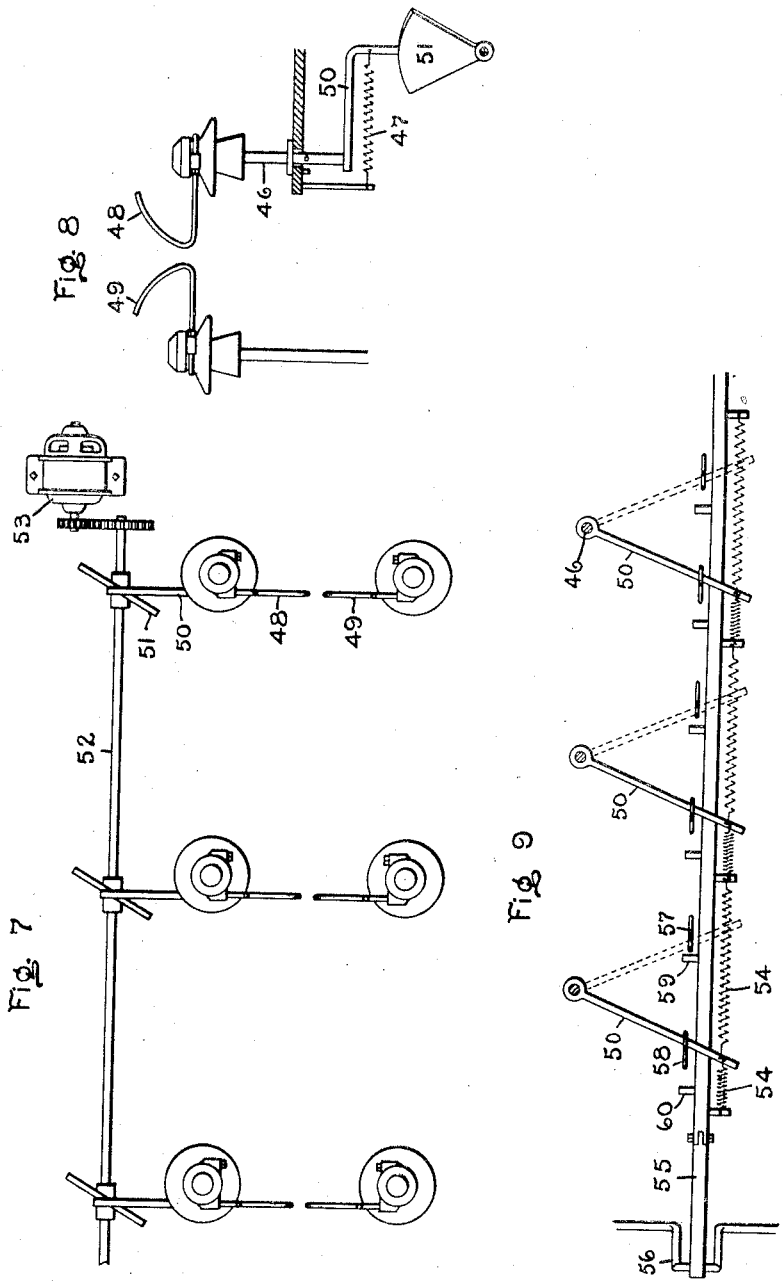

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

LIGHTNING-ARRESTER.

982,224.　　　　　Specification of Letters Patent.　　Patented Jan. 17, 1911.

Application filed July 6, 1909. Serial No. 506,154.

*To all whom it may concern:*

Be it known that I, ELMER E. F. CREIGHTON, a citizen of the United States, residing at Schenectady, in the county of Schenectady, State of New York, have invented certain new and useful Improvements in Lightning-Arresters, of which the following is a specification.

This invention relates to devices for protecting high potential transmission systems from the injurious effects of lightning discharges, and more especially to that class of such devices known as electrolytic cell arresters.

It is now common practice to install between a transmission line and ground lightning arresters composed of cells containing an electrolyte and a plurality of electrodes of aluminum on which has been formed a film of hydroxid, which serves to hold back any flow of dynamic current until a predetermined critical voltage is reached. When this voltage is exceeded, as will occur when a lightning discharge takes place over the line, the film breaks down and permits a free passage of the current until the voltage falls below the critical value, whereupon the film automatically prevents all further current flow. In the practical operation of such devices, it is customary to connect them to ground through a spark gap, so that under ordinary conditions no current flows through the arrester cell or cells. It is found that the electrolyte is liable to weaken the film in this inactive condition, so that once in a while the circuit must be closed for a few seconds in order to re-form the film and keep it in operative condition. As the cells are proportioned to break down at a voltage somewhat higher than the normal voltage of the transmission line, the full potential of the line must be applied to the cells in order to send enough current through them to build up the film. On transmission lines consisting of two or more conductors, it is customary to provide as many electrolytic cells as there are conductors, each cell having one terminal connected to the conductor and the other terminal connected to a common or neutral point, which in turn is connected to ground through a ground leg or cell. The cells are usually connected to the conductors of the transmission line through spark gaps and merely closing the spark gaps in any suitable way will apply the full potential of the line and thereby build up the film of the cells directly connected to the conductors, but will not send enough current through the ground cell to keep its film in good condition.

The object of my invention is to provide means whereby the films in all the cells may be kept in good condition, preferably by providing a selective control or switching mechanism by means of which any desired cell can be connected in as a ground cell, so that if the film on the ground cell becomes deteriorated, the operator can at will select some other cell in which the film is in good condition and connect it in as the ground cell, while the cell which has previously been used as a ground cell and in which the film has deteriorated is connected to the line, so that by suitable transposition and interchange of the cells the films in all of the cells may be kept in good condition.

A further object of my invention is to provide mechanical means for automatically closing the circuit to charge the cells and build up the films, preferably by means of switches for closing the spark gaps and a motor for actuating the switches at predetermined intervals.

A further object of my invention is to so connect the switches for closing the spark gaps to the selective or control mechanism for transposing the cells that at intervals the ground cell and one of the line cells is transposed and thereby the film is automatically kept in good condition in all of the cells.

Figure 5:
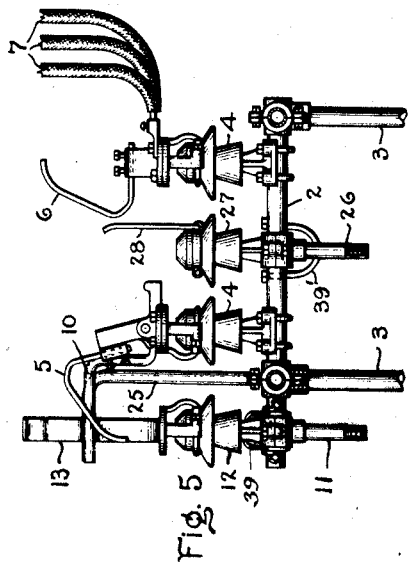
Figure 6:
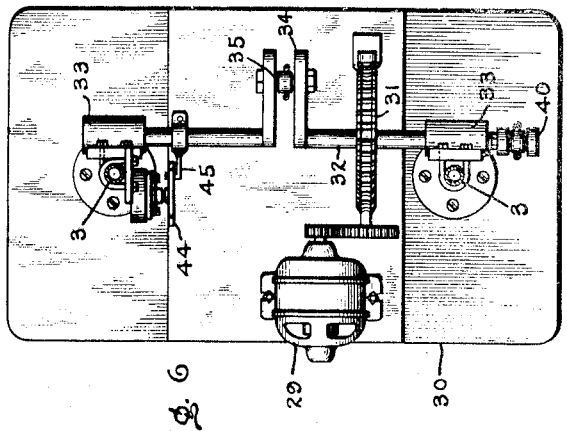
Figure 4:
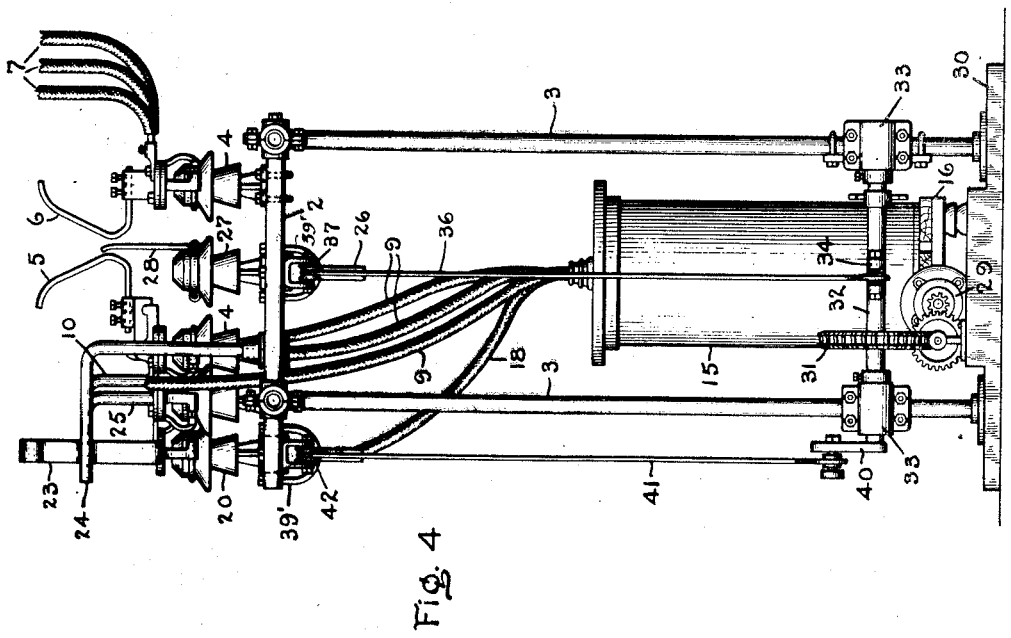

In the accompanying drawings, Figure 1 is a side elevation of a lightning arrester for a three-phase circuit embodying my invention; Fig. 2 is a top plan view of the same; Fig. 3 is a side elevation of the spark gaps, showing the switches closed; Fig. 4 is an end elevation; Fig. 5 is a cross section on the line 5—5, Fig. 1, showing one of the horns of a spark gap thrown back; Fig. 6 is a top plan view of the motor on a larger scale; Fig. 7 is a plan view of a modification; Fig. 8 is a partial end view of the same, and Fig. 9 shows a further modification.

In the system illustrated, each leg of the three-phase line is connected through a spark gap with a suitable number of aluminum cells arranged in series and inclosed in a tank filled with oil. The three tanks are connected in Y and from the neutral point of the connection a ground leg is provided, which includes a fourth tank containing a series of aluminum cells. Inasmuch as the periodic closing of the circuit through the line tanks would not affect the tank in the ground leg, it is necessary to provide for substituting this tank for one of the line tanks at intervals to insure maintaining the film therein. The apparatus shown in Sheets 1, 2 and 3 of the drawings is designed to accomplish these results.

The frame is composed preferably of metallic rods or pipes and couplings and comprises two horizontal parallel side bars 1 connected by cross bars 2, and supported on standards 3. On three of the cross bars are mounted two insulators 4 of any approved type, each of which carries one of a pair of horns 5 6, forming a spark gap of well known design. The horn 5 of each pair is hinged to its support, so that it can be thrown back, as shown in Fig. 5, when it is desired to open the leg in which such spark gap is included. A lead 7 from each of the line conductors is connected with its respective spark gap, being connected to the horn 6 thereof. The other horn of the spark gaps $a$ and $b$ is respectively connected to the set of aluminum cells in its respective tank $8^a$ $8^b$ by means of the lead 9. The third spark gap $c$ has its horn 5 carried on a support to which is secured a stout arm 10 having a horizontal portion extending laterally above the adjacent bar 1 of the frame. Below this arm an upright lever 11 is fulcrumed, carrying an insulator 12 to which is secured a flexible finger 13 adapted to make good contact with the arm when the lever is upright, as shown in Fig. 1. The lead 9 from the tank $8^c$ is connected to this finger, so that the spark gap $c$ is thus normally connected with its respective arrester.

The bottom plate in each arrester is electrically connected with its tank, and the three tanks are all connected by the strip 14. A fourth arrester 15 is also connected with the others, preferably by the same strip, and all the arresters are supported on a table 16, standing on insulators 17. The tier of cells in the arrester 15 is connected by a lead 18 with a flexible conducting strip 19 secured at one end to an insulator 20 mounted on one of the bars of the frame. When the film on the ground cell 15 deteriorates, this arrester may be connected directly to line and the arrester $8^c$ connected in as the ground cell by means of any suitable selective mechanism or switch, such as that shown in the drawings, in which, adjacent to the insulator 20 and between it and the spark gap $c$ an upright lever 21 is fulcrumed on a horizontal transverse pivot and carries an insulator 22, to which is secured a flexible finger 23, which normally makes contact with a horizontal portion of an upright 24 secured to the frame 1. The frame is grounded, so that this construction puts the arrester 15 in a ground leg so long as the parts remain in their normal position, as shown in Fig. 1. An upright 25 is secured to the frame adjacent to the spark gap $c$, but on the other side thereof from the upright 24. When the two levers 11 and 21 are rocked to the position shown in Fig. 3, so that the finger 23 makes contact with the arm 10 and the finger 13 touches the upright 25, the arrester 15 will be in circuit with the spark gap $c$ and the arrester $8^c$ will be grounded, thus reversing the connections of the two arresters from those shown in Fig. 1. This changed condition of affairs is shown in Fig. 3.

In order to keep the films in the cells in good condition some suitable current controlling means is provided, by means of which current can be passed through the cells. In order to cause a sufficient amount of current to flow through the cells, the full potential of the line must be impressed upon them, and while various forms of circuit controlling devices for impressing the line potential upon the cells may be used, the preferred form is that shown in the drawings, in which, between the insulators 4 on each cross bar there is fulcrumed an upright lever 26 carrying an insulator 27, on which is secured a wiper 28 adapted to pass between the roots of the horns when said lever is vibrated. Such passage of the wiper operates to practically close the spark gap and permit a flow of line current through the arrester in circuit therewith. By periodically oscillating these wipers the films will be re-formed; and if at every alternate re-forming the connections of the arresters $8^c$ and 15 are reversed, as described, the film of the arrester in the ground leg will be kept in good condition, also. I may actuate these levers 11, 21 and 26 by hand, but I prefer to effect this actuation automatically by means of a small electric motor 29, preferably mounted on a base plate 30 at one end of the frame, and driving a worm gear 31 secured to a shaft 32 journaled in transverse bearings 33 on the standards 3. Midway of this shaft is a crank 34 having a wrist pin 35 adjustable in slots in said crank so as to vary the effective throw of the crank. A cord 36 is connected with the wrist pin 35 and runs up over a pulley 37 on the end of the frame to the nearest upright lever 26, which in turn is connected by the cords or links 38 with the other levers 26, so that when the crank 34 rotates downwardly it will pull the levers into the position shown in Fig. 3 and thus cause the wipers 28 to pass between the horns of the spark gaps. The wipers reach this position when the crank 34 has made a quarter revolution from the upper center at which it is shown in Fig. 1. During the next quarter revolution, the wipers are carried beyond the spark gaps, so that by the time the crank arrives at the lower dead center said wipers will stand as far away from the gaps as in Fig. 1, but on the other side. As the crank continues its revolution the wipers are returned by springs 39 and again approach the gaps until at the third quarter they will again pass between them. Thus for every complete revolution of the crank 34 the wipers will close the ground circuit through the arresters two times.

The rocking members, such as the lever 21 and lever 26, as best shown in Figs. 3 and 5, are prevented from moving along the pipe supports on which they are mounted by clips 39′, which pass through the pipe supports on each side of the rocking members. These clips also act as stops for the rocking members.

At one end of the shaft 32 is another crank 40 set a quarter revolution behind the crank 34 and having an adjustable pin to which is attached a cord 41 running over a pulley 42 on the end of the frame to the lower end of the lever 21, which in turn is connected by a cord or link 43 with the lever 11. During the upper half revolution of this crank 40 the cord 41 is slacked and produces no effect upon the levers 21 11; but when said crank reaches the first quarter in its downward movement away from the upper dead center, it begins to pull on the cord and by the time said crank arrives at the lower dead center it will have pulled the levers 21 11 over into the position shown in Fig. 3, whereby a reversal of the connections of the arresters 8ᶜ 15 is effected, as described above. This occurs at the instant that the wipers are returning through the spark gaps, the crank 34 being at the third quarter. On the next passage of the wipers, the crank 40 is passing through its upper half revolution, and, therefore, at this passage of the wipers through the gaps the levers 21 11 are not actuated and the connections of the arresters are not reversed. It thus appears that the mechanism described will automatically close the spark gaps at regular intervals, and that at every alternate closure the connections of the last two arresters will be reversed to effect a building up of the film in the ground leg arrester. Inasmuch as this closing of the gaps needs to be done only once or twice a day, the electric motor may be conveniently controlled by a time switch operating to turn the current on at predetermined intervals, and the motor can be stopped at the end of an exact revolution by means of a suitable limit switch 44, controlled by a tapper 45 on the shaft of the motor.

In the modifications shown in Figs. 7 and 8, one of the horns of each spark gap is carried on an upright rotatable shaft 46, which is provided with a spring 47, by means of which the horn 48 is kept normally turned away from proximity to the other horn 49. The shaft is provided also with a rock arm 50 adapted to be acted on by a cam 51 on a shaft 52 capable of being rotated by suitable means, such as the motor 53. The cam causes the horn 48 to approach the horn 49 until they stand in line, as shown in Fig. 7, at which time the space between them is such, by previous calculation, as to permit a spark to pass and the circuit to be momentarily closed through the arresters. When the cam passes the rock arm, the spring throws the horn back to its normal position in which the spark gap is too great for the line current to jump it.

In Fig. 9, a modified actuating mechanism is shown, which may be substituted for the cam shaft shown in Fig. 7. The rock arms 50 are each connected by two opposed springs 54 with a bar 55 which can be reciprocated by a crank 56. The drawing shows the crank 56 standing at an angle with the plane of the paper, and the bar 55 moving toward the right. Catches 57 58 hold the rock arms at each end of their arc of vibration. On the bar are lugs 59 and 60 which trip the catches as the bar reciprocates, and after the springs (one or the other) have been put under tension by the movement of said bar. The lugs 59 trip the catches 57 successively to connect the line cells one after the other between line and ground in series with the ground cell, the lugs 59 being set progressively along the bar, as shown; while the lugs 60 trip the catches 58 simultaneously to connect all the line cells in parallel to the neutral and thence to ground through the ground cell. The instant a catch is tripped, its rock arm will be snapped over to its other position by the spring under tension, where it will be automatically caught and held by the other catch. During this movement, the horn on the insulator carried by the upright shaft on which the rock arm is secured will pass swiftly by the stationary horn of the pair, and the circuit will be momentarily closed.

What I claim as new and desire to secure by Letters Patent of the United States, is—

1. The combination with a plurality of conductors, of a plurality of electrolytic condensers with their corresponding terminals electrically connected, and a selective control mechanism whereby at will part of the other terminals of said condensers may be connected to ground and the remainder to said conductors.

2. The combination with a plurality of conductors, of a plurality of electrolytic condensers having their corresponding terminals electrically connected, and a switching mechanism coöperating with the other terminals of said condensers to connect at will any one of said condensers to ground and the remainder of said condensers to said conductors.

3. The combination with the conductors of a polyphase system, of electrolytic condensers exceeding said conductors in number by one and having their corresponding terminals electrically connected, and selective controlling mechanism for the other terminals of said condensers whereby said conductors may be connected at will to selected condensers and the remaining condenser connected to ground.

4. The combination with two electrolytic condensers having their corresponding terminals electrically connected, of means coöperating with the other terminals of said condensers whereby either of said other terminals may be connected to ground at will.

5. The combination with a three phase system having three conductors, of four electrolytic condensers with corresponding terminals electrically connected and the other terminals of two of said condensers directly connected to two of said conductors, and means whereby either of the remaining two condensers may be connected to ground and the other connected to the third conductor.

6. The combination with an electrolytic lightning arrester, of a horn spark gap in series therewith, a lever in line with said gap, a wiper insulated from said lever and adapted to pass through said spark gap, and means for periodically causing it so to do.

7. The combination with a frame, of a plurality of horn spark gaps mounted thereon, levers pivotally supported on said frame and each adjacent to its respective spark gap, a wiper carried by each lever and adapted to pass between the horns of the spark gap, and means for periodically and simultaneously actuating said levers.

8. The combination of a frame having side bars and cross bars, pairs of insulators supported on said frame, arc-extinguishing horns supported on said insulators, levers pivotally mounted on said cross bars between said insulators, an insulator on each lever, a wiper supported thereon and adapted to pass between said horns, and means for simultaneously actuating said levers.

9. The combination with a polyphase transmission line, of an electrolytic lightning arrester between each line conductor and a neutral point, a spark gap in series with each lightning arrester, an electrolytic arrester connected between the neutral point and ground, means for periodically closing the circuit through the line arresters, and means for occasionally transposing the connections of the ground leg arrester and one of the line arresters.

10. The combination with a polyphase transmission line, of an electrolytic lightning arrester between each line conductor and a neutral point, an arrester between said neutral point and ground, horn spark gaps for said line arresters, two levers adjacent to one of said gaps, one connected with one of the line arresters and the other with the ground leg arrester, and means for placing either one of said levers in circuit with said horn.

11. The combination with a frame, of insulated spark gaps supported thereon, uprights adjacent to one of said gaps, electrolytic lightning arresters in series with said spark gaps, a lever pivoted on said frame adjacent to one of said spark gaps and normally in circuit therewith but adapted to make contact with one of said uprights when tilted, another lever pivoted on the frame and carrying an insulated finger in contact with the other upright, a ground leg arrester connected with the neutral point of connection of the line arresters and with said finger, and means for tilting said levers to cause said finger to be placed in circuit with said spark gap.

12. The combination with a frame, of insulators arranged thereon in pairs, spark gap horns mounted on said insulators, one being provided with an upright arm, uprights erected on said frame on each side of the aforesaid arm, levers pivoted on the frame adjacent to the spark gap and one of said uprights, insulated fingers on said levers adapted to bear normally against one of said uprights and said arm, means for tilting said levers to cause the finger bearing against the arm to make contact with the other upright and the finger bearing against the upright to make contact with said arm, and electrolytic lightning arresters in circuit with said spark gaps and lever fingers.

13. The combination with a frame, of spark gaps thereon, wipers adapted to pass between said gaps, electrolytic lightning arresters in series with said gaps, a ground leg provided with a lightning arrester, levers for transposing the circuit connections of said ground leg and one of the line arresters, and a crank shaft for actuating said wipers and levers.

14. The combination with electrolytic lightning arresters, of spark gaps in series therewith, a ground leg provided with a lightning arrester, wipers adapted to pass through said spark gaps, levers for transposing the circuit connections of one of the line arresters and the ground leg arrester, and means for actuating said levers at every alternate passage of the wipers through the gaps.

15. A protective device comprising electrolytic cells connected to a common neutral, an electrolytic cell connected between said neutral and ground to form a ground cell, circuit controlling means for passing current through said cells, switching mechanism for transposing the circuit connections of said ground cell and one of said line cells, and means for rendering the operation of said circuit controlling means and said switching mechanism interdependent.

16. A protective device comprising a plurality of electrolytic cells connected to line and to a neutral, a ground cell connected between said neutral and ground, switching mechanism for transposing the circuit connections of said ground cell and one of said line cells, circuit controlling means for passing current through said cells, and connections whereby after a predetermined number of operations of said circuit controlling means said switch mechanism is automatically operated.

17. The combination with the conductors of a transmission system, of a plurality of line electrolytic cells connected to said conductors through spark gaps and connected to a neutral, a ground cell between said neutral and ground, conducting members mounted to bridge said spark gaps when actuated and thereby permit current to flow through said cells, switching mechanism for transposing the connections of said ground cell and one of said other cells, and means for actuating said conducting members and said switching mechanism in definite sequence.

In witness whereof, I have hereunto set my hand this 2nd day of July, 1909.

ELMER E. F. CREIGHTON.

Witnesses:
BENJAMIN B. HULL,
HELEN ORFORD.